(12) United States Patent
Batchelder et al.

(10) Patent No.: US 7,897,074 B2
(45) Date of Patent: Mar. 1, 2011

(54) LIQUEFIER ASSEMBLY FOR USE IN EXTRUSION-BASED DIGITAL MANUFACTURING SYSTEMS

(75) Inventors: J. Samuel Batchelder, Somers, NY (US); William J. Swanson, St. Paul, MN (US)

(73) Assignee: Stratasys, Inc., Eden Prairie, MN (US)

( * ) Notice: Subject to any disclaimer, the term of this patent is extended or adjusted under 35 U.S.C. 154(b) by 429 days.

(21) Appl. No.: 12/150,669

(22) Filed: Apr. 30, 2008

(65) Prior Publication Data

US 2009/0273122 A1 Nov. 5, 2009

(51) Int. Cl.
*B29C 41/02* (2006.01)
*B29C 41/46* (2006.01)
*B29C 41/52* (2006.01)

(52) U.S. Cl. .................. 264/40.1; 264/308; 425/375; 425/378.1

(58) Field of Classification Search .............. 264/40.1, 264/308; 425/375, 378.1
See application file for complete search history.

(56) References Cited

U.S. PATENT DOCUMENTS

| | | | |
|---|---|---|---|
| 4,384,862 A | 5/1983 | Nakane | |
| 4,557,788 A | 12/1985 | Dana et al. | |
| 4,749,347 A | 6/1988 | Valavaara | |
| 5,121,329 A | 6/1992 | Crump | |
| 5,134,569 A | 7/1992 | Masters | |
| 5,303,141 A | 4/1994 | Batchelder et al. | |
| 5,312,224 A | 5/1994 | Batchelder et al. | |
| 5,340,433 A | 8/1994 | Crump | |
| 5,474,719 A | 12/1995 | Fan et al. | |
| 5,503,785 A | 4/1996 | Crump et al. | |
| 5,738,817 A | 4/1998 | Danforth et al. | |
| 5,764,521 A | 6/1998 | Batchelder et al. | |
| 5,779,793 A | 7/1998 | Sand | |
| 5,900,207 A | 5/1999 | Danforth et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A | 7/2000 | Zinniel et al. | |

(Continued)

OTHER PUBLICATIONS

International Search Report and Written Opinion of counterpart Application No. PCT/US09/01598 filed on Mar. 13, 2009.

(Continued)

*Primary Examiner*—Leo B Tentoni
(74) *Attorney, Agent, or Firm*—Brian R. Morrison; Westman, Champlin & Kelly, P.A.

(57) ABSTRACT

A liquefier assembly comprising a liquefier tube, where the liquefier tube comprises a sidewall having an inlet opening configured to receive a filament strand, an outlet opening, and a port disposed through the sidewall at a location between the inlet opening and the outlet opening, the port being configured to provide access for a filament drive mechanism to engage with the received filament strand. The liquefier assembly further comprises a heat transfer component configured to generate a thermal gradient along a longitudinal length of the sidewall between the port and the outlet opening.

20 Claims, 6 Drawing Sheets

U.S. PATENT DOCUMENTS

| | | |
|---|---|---|
| 6,129,872 A | 10/2000 | Jang |
| 6,214,279 B1 | 4/2001 | Yang et al. |
| 6,238,613 B1 | 5/2001 | Batchelder et al. |
| 6,257,517 B1 | 7/2001 | Babish et al. |
| 6,547,995 B1 | 4/2003 | Comb |
| 6,578,596 B1 | 6/2003 | Batchelder et al. |
| 6,645,412 B2 | 11/2003 | Priedeman, Jr. et al. |
| 6,685,866 B2 | 2/2004 | Swanson et al. |
| 6,722,872 B1 | 4/2004 | Swanson et al. |
| 6,749,414 B1 | 6/2004 | Hanson et al. |
| 6,776,602 B2 | 8/2004 | Swanson et al. |
| 6,814,907 B1 | 11/2004 | Comb |
| 6,923,634 B2 | 8/2005 | Swanson et al. |
| 6,998,087 B1 | 2/2006 | Hanson et al. |
| 7,169,337 B2 | 1/2007 | Swanson et al. |
| 7,172,715 B2 | 2/2007 | Swanson et al. |
| 7,625,200 B2 | 12/2009 | Leavitt |
| 2001/0030383 A1 | 10/2001 | Swanson et al. |
| 2001/0038168 A1 | 11/2001 | Popa et al. |
| 2003/0011103 A1 | 1/2003 | Swanson et al. |
| 2004/0129823 A1 | 7/2004 | Swanson et al. |
| 2004/0217517 A1 | 11/2004 | Swanson et al. |
| 2004/0245663 A1 | 12/2004 | MacDougald et al. |
| 2005/0004282 A1 | 1/2005 | Priedeman et al. |
| 2006/0078081 A1 | 4/2006 | Bilanin et al. |
| 2007/0228590 A1 | 10/2007 | LaBossiere et al. |
| 2009/0295032 A1 | 12/2009 | Hopkins |

OTHER PUBLICATIONS

Office Action dated Mar. 29, 2010 for U.S. Appl. No. 12/150,667, filed Apr. 30, 2008.

US 7,897,074 B2

LIQUEFIER ASSEMBLY FOR USE IN EXTRUSION-BASED DIGITAL MANUFACTURING SYSTEMS

CROSS-REFERENCE TO RELATED APPLICATION(S)

Reference is hereby made to U.S. patent application Ser. No. 12/150,667, filed on Apr. 30, 2008, entitled "Filament Drive Mechanism For Use In Extrusion-Based Digital Manufacturing Systems", and published as U.S. Patent Application Publication No. 2009/0274540.

BACKGROUND

The present invention relates to digital manufacturing systems for building three-dimensional (3D) objects. In particular, the present invention relates to extrusion-head liquefiers for use in extrusion-based digital manufacturing systems.

An extrusion-based digital manufacturing system (e.g., fused deposition modeling systems developed by Stratasys, Inc., Eden Prairie, Minn.) is used to build a 3D object from a computer-aided design (CAD) model in a layer-by-layer manner by extruding a flowable build material. The build material is extruded through an extrusion tip carried by an extrusion head, and is deposited as a sequence of roads on a substrate in an x-y plane. The extruded build material fuses to previously deposited build material, and solidifies upon a drop in temperature. The position of the extrusion head relative to the substrate is then incremented along a z-axis (perpendicular to the x-y plane), and the process is then repeated to form a 3D object resembling the CAD model.

Movement of the extrusion head with respect to the substrate is performed under computer control, in accordance with build data that represents the 3D object. The build data is obtained by initially slicing the CAD model of the 3D object into multiple horizontally sliced layers. Then, for each sliced layer, the host computer generates a build path for depositing roads of build material to form the 3D object.

In fabricating 3D objects by depositing layers of build material, supporting layers or structures are typically built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. Support material is then deposited from a second nozzle pursuant to the generated geometry during the build process. The support material adheres to the build material during fabrication, and is removable from the completed 3D object when the build process is complete.

SUMMARY

The present invention relates to a liquefier assembly for use in an extrusion-based digital manufacturing system, an extrusion head containing the liquefier assembly, and a method of building a 3D object with the extrusion-based digital manufacturing system. The liquefier assembly includes a liquefier tube having a sidewall, an inlet opening configured to receive a filament strand, an outlet opening, and a port disposed through the sidewall at a location between the inlet opening and the outlet opening, where the port is configured to provide access for a filament drive mechanism to engage with the received filament strand. The liquefier assembly also includes a heat transfer component configured to generate a thermal gradient along at least a portion of a longitudinal length of the sidewall between the port and the outlet opening.

DETAILED DESCRIPTION

Figure 1:
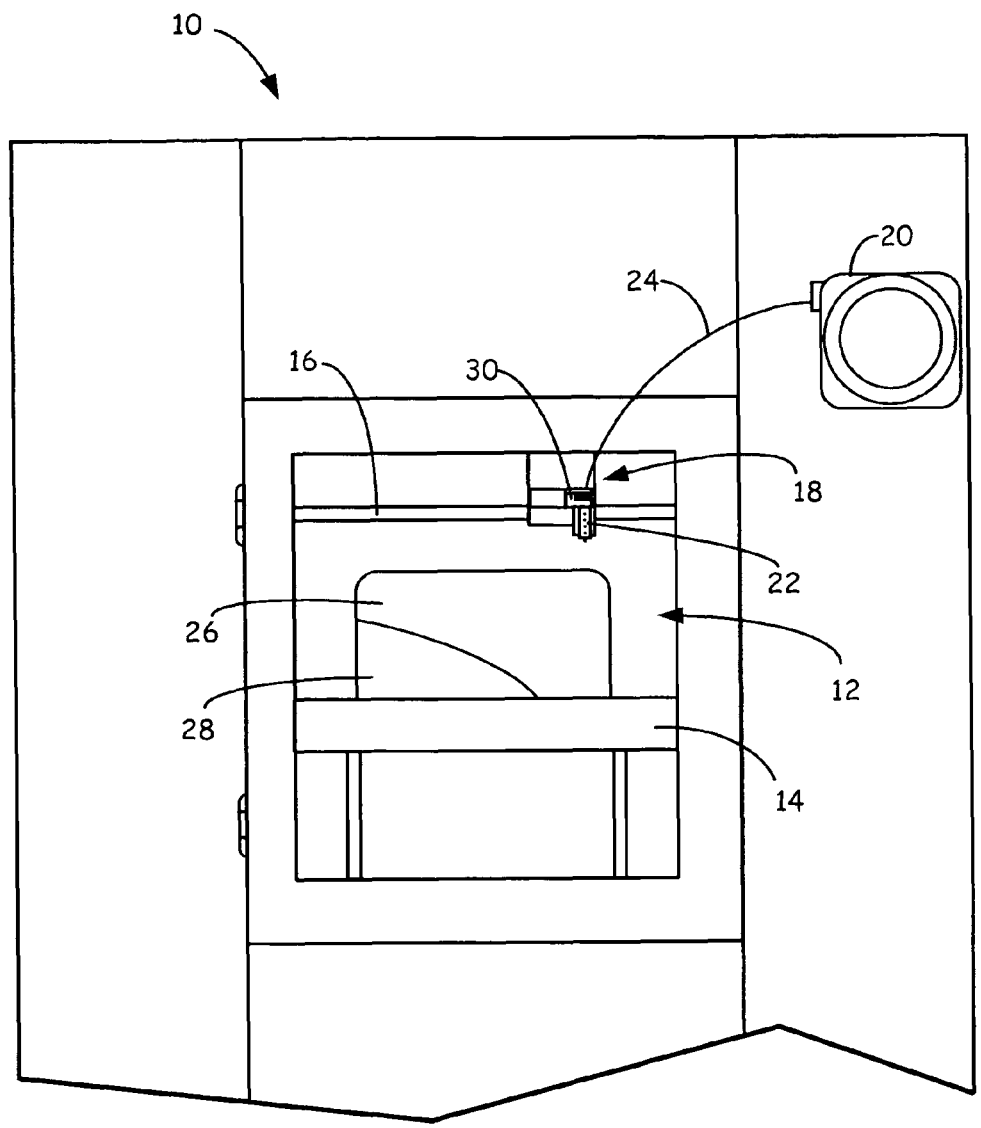
FIG. 1 is a front view of an extrusion-based digital manufacturing system that includes a liquefier assembly for melting received filament strands.

FIG. 1 is a front view of system 10, which is an extrusion-based digital manufacturing system that includes build chamber 12, substrate 14, gantry 16, extrusion head 18, and filament supply source 20, where extrusion head 18 includes liquefier assembly 22. As discussed below, liquefier assembly 22 is a ported liquefier for melting successive portions of filament 24 during a build operation with system 10. Suitable digital manufacturing systems for system 10 include fused deposition modeling systems developed by Stratasys, Inc., Eden Prairie, Minn. Build chamber 12 is an enclosed environment that contains substrate 14, gantry 16, and extrusion head 18 for building a 3D object (referred to as 3D object 26) and a corresponding support structure (referred to as support structure 28).

Substrate 14 is a platform on which 3D object 26 and support structure 28 are built, and moves along a vertical z-axis based on signals provided from a computer-operated controller (not shown). Gantry 16 is a guide rail system configured to move extrusion head 18 in a horizontal x-y plane within build chamber 12 based on signals provided from the computer-operated controller. The horizontal x-y plane is a plane defined by an x-axis and a y-axis (not shown in FIG. 1), where the x-axis, the y-axis, and the z-axis are orthogonal to each other. In an alternative embodiment, substrate 14 may be configured to move in the horizontal x-y plane within build chamber 12, and extrusion head 18 may be configured to move along the z-axis. Other similar arrangements may also be used such that one or both of substrate 14 and extrusion head 18 are moveable relative to each other.

Extrusion head 18 is supported by gantry 16 for building 3D object 26 and support structure 28 on substrate 14 in a layer-by-layer manner, based on signals provided from the computer-operated controller. In addition to liquefier assembly 22, extrusion head 18 also includes drive mechanism 30 engaged with liquefier assembly 22, where drive mechanism 30 feeds successive portions of filament 24 through liquefier assembly 22 from filament supply source 20. Liquefier assembly 22 thermally melts the successive portions of filament 24, thereby allowing the molten material to be extruded to build 3D object 26 or support structure 28. For ease of discussion, extrusion head 18 is shown in FIG. 1 with a single liquefier (i.e., liquefier assembly 22) and a single filament drive mechanism (i.e., drive mechanism 30). However, extrusion head 18 may include multiple filament drive mechanisms and liquefiers for extruding multiple build and/or support materials.

Filament supply source 20 is a supply source (e.g., a spooled container) for filament 24, which is desirably retained at a remote location from build chamber 12. Filament 24 is a filament strand of a build or support material for building 3D object 26 or support structure 28, respectively. The dimensions of filament 24 may vary depending on the material of filament 24, and on the dimensions of liquefier assembly 22 and drive mechanism 30. Examples of suitable average diameters for filament 24 range from about 1.143 millimeters (about 0.045 inches) to about 2.54 millimeters (about 0.100 inches). Suitable assemblies for filament supply source 20 and suitable filament strands for filament 24 are disclosed in Swanson et al., U.S. Pat. No. 6,923,634 and Comb et al., U.S. Pat. No. 7,122,246. While the materials of filament 24 are discussed herein as being build materials and support materials, suitable materials for use with extrusion head 18 include any type of extrudable material (e.g., thermoplastic materials).

During a build operation, gantry 16 moves extrusion head 18 around in the horizontal x-y plane within build chamber 12, and drive mechanism 30 is directed to feed successive portions of filament 24 through liquefier assembly 22 from filament supply source 20. As shown, the feed pathway of filament 24 between filament supply source 20 and extrusion head 18 is desirably curved. As such, filament 24 desirably enters liquefier assembly 22 in a curved orientation. As discussed below, the curved orientation reduces the axial rotation of filament 24 as drive mechanism 30 feeds the successive portions of filament 24 through liquefier assembly 22. The received portions of filament 24 are melted within liquefier assembly 22, and the upstream, unmelted portions of filament 24 function as a piston with a viscosity-pump action to extrude the molten material out of extrusion head 18. Examples of suitable extrusion rates from extrusion head 18 based on the drive rate of filament 24 from drive mechanism 30 include rates up to about 6,000 micro-cubic-inches/second (mics).

Figure 2:
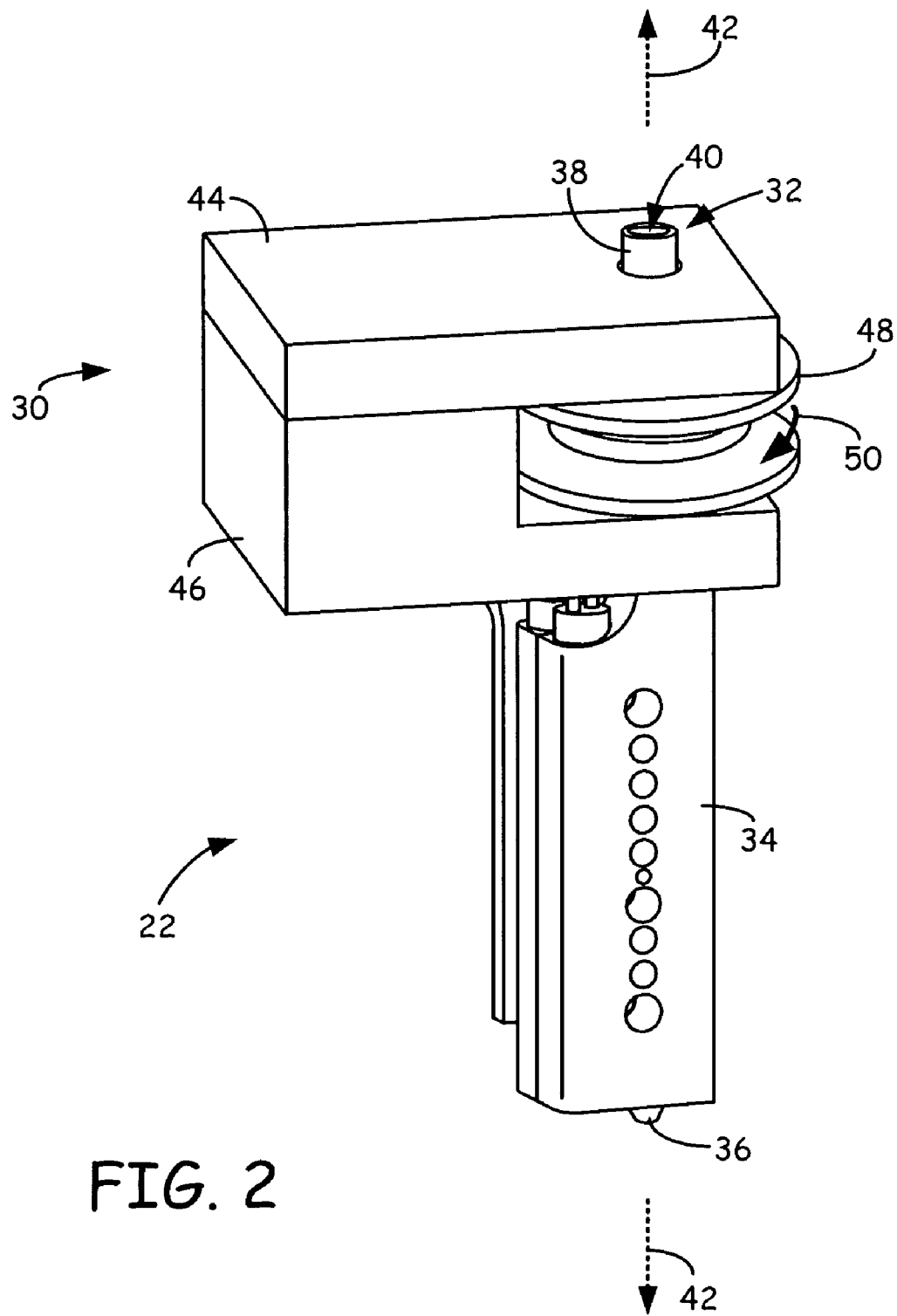
FIG. 2 is a top perspective view of the liquefier assembly in use with a filament drive mechanism having a rotatable pulley.

FIG. 2 is a top perspective view of liquefier assembly 22 in use with drive mechanism 30. As shown, liquefier assembly 22 includes liquefier tube 32, thermal block 34, and extrusion tip 36, where liquefier tube 32 is a hollow tube that extends through drive mechanism 30 and thermal block 34, and is configured to receive filament 24 (shown in FIG. 1). As used herein, the term "tube" includes a variety of hollow geometries that allow filament 24 to pass through, such as cylindrical geometries, elliptical geometries, polygonal geometries (e.g., rectangular and square geometries), axially-tapered geometries, and the like. Liquefier tube 32 includes sidewall 38, inlet opening 40, and an outlet opening (not shown in FIG. 2) that is opposite from inlet opening 40. Sidewall 38 is the circumferential, thin-wall portion of liquefier tube 32 that has a longitudinal length along axis 42, and is desirably formed from a metallic material (e.g., stainless steel). Inlet opening 40 is an opening at a first end of sidewall 38 along axis 42, which is configured to receive filament 24 from filament supply source 20 (shown in FIG. 1). The outlet opening of liquefier tube 32 is an opening at a second end of sidewall 38 along axis 42 that allows the molten material of filament 24 to exit liquefier tube 32 through extrusion tip 36.

Thermal block 34 is a heat transfer component that extends around a portion of liquefier tube 32, and is configured to generate a thermal gradient along axis 42. Examples of suitable heat transfer components for thermal block 34 include those disclosed in Swanson et al., U.S. Pat. No. 6,004,124; Comb, U.S. Pat. No. 6,547,995; and LaBossiere et al., U.S. Publication No. 2007/0228590. In alternative embodiments, thermal block 34 may be replaced with a variety of different heat transfer components that generate thermal gradients along axis 42 (e.g., conductive, convective, and inductive heat transfer components). The thermal gradient generated by thermal block 34 creates a temperature profile in filament 24 along axis 42, which melts successive portions of filament 24 as filament 24 is driven through liquefier tube 32. The properties of the generated thermal gradient may vary depending on the material and feed rate of filament 24, and desirably allow the unmelted portion of filament 24 to function as a piston with a viscosity-pump action to extrude the molten portion out of extrusion tip 36.

Extrusion tip 36 is a small-diameter tip that is desirably secured to sidewall 38 at the outlet opening of sidewall 36, and is configured to extrude the molten material of filament 24 with a desired road width. In one embodiment, extrusion tip 36 is removably securable to sidewall 38, thereby allowing multiple extrusion tips 36 to be interchangeably used. Examples of suitable inner tip diameters for extrusion tip 36 range from about 125 micrometers (about 0.005 inches) to about 510 micrometers (about 0.020 inches).

Drive mechanism 30 includes support plate 44, base block 46, and pulley 48, where pulley 48 is rotatably secured between support plate 44 and base block 46. Support plate 44 and base block 46 are support components of drive mechanism 30, and one or both of support plate 44 and base block 46 are desirably secured to extrusion head 18 (shown in FIG. 1). Pulley 48 is a rotatable component that drives successive portions of filament 24 through liquefier tube 32 with the use of an internally-threaded surface (not shown in FIG. 2). Examples of suitable filament drive mechanisms for drive mechanism 30 include those disclosed in U.S. Patent Application Publication No. 2009/027454, where liquefier tube 32 functions as the ported filaments tube of the filament drive mechanisms. As such, liquefier assembly 22 is engaged with drive mechanism 30, and thermal block 34 may be secured to base block 46.

In alternative embodiments, pulley 48 may be replaced with a variety of different rotatable components that have internally-threaded surfaces, thereby allowing alternative rotatable components to drive filament 24. For example, pulley 48 may be replaced with a rotatable gear that operably engages with one or more additional motor-driven gears (not shown) to drive filament 24. Examples of suitable rotatable gear configurations include spur, herringbone, bevel, sector, and combinations thereof. Alternatively, pulley 48 may be replaced with a friction-drive roller that operably engages with one or more additional motor-driven rollers (not shown) to drive filament 24. Furthermore, pulley 48 may be replaced with a rotatable component that is axially connected to a drive motor (not shown), thereby allowing the drive motor to directly rotate the rotatable component. For example, the rotatable component may be a threaded hollow shaft of a drive motor, where filament 24 is driven by the rotation of the threaded hollow shaft.

During a build operation in system 10 (shown in FIG. 1), filament 24 is loaded into liquefier tube 32 at inlet opening 40 to engage with the internally-threaded surface of pulley 48. Pulley 48 is then rotated (represented by arrow 50) based on signals provided from the computer-operated controller (not shown). The rotation of pulley 48 correspondingly rotates the internally-threaded surface of pulley 48, which drives successive portions of filament 24 through liquefier tube 32. As filament 24 passes through liquefier tube 32, the thermal gradient generated by thermal block 34 melts the material of filament 24 within liquefier tube 32. The upstream, unmelted portion of filament 24 being driven by drive mechanism 30 functions as a piston with a viscosity pump acting on the molten material between the unmelted portion and sidewall 38, thereby extruding the molten material out of liquefier tube 32 and extrusion tip 36. The extruded material is then deposited as roads to form 3D object 26 (shown in FIG. 1) or support structure 28 (shown in FIG. 1) in a layer-by-layer manner.

As shown in FIG. 2, inlet opening 40 of liquefier tube 32 is located at an upstream position along axis 42 relative to drive mechanism 30. As such, filament 24 enters liquefier tube 32 prior to engaging with drive mechanism 30, and is continuously supported by filament tube 32 during and after the engagement with drive mechanism 30. This is in contrast to an extrusion head having a filament drive mechanism that is separate from the liquefier tube, where the filament drive mechanism engages and drives the filament strand into the liquefier tube. In such an extrusion head, to ensure proper entry into the liquefier tube, the filament strand exiting the filament drive mechanism is typically required to be properly aligned with the inlet opening of the liquefier tube. Additionally, the filament strand may potentially buckle under the compression between the filament drive mechanism and the inlet opening of the liquefier tube. Each of these issues may reduce the efficiency and accuracy of the extrusion head during a build operation. In contrast, as shown in FIG. 2, the location of inlet opening 40 (i.e., upstream from drive mechanism 30 along axis 42) effectively prevents these issues from occurring. This reduces the risk of interrupting a build operation with extrusion head 18, and may allow higher driving forces to be attained because filament 24 is supported from buckling.

Figure 3:
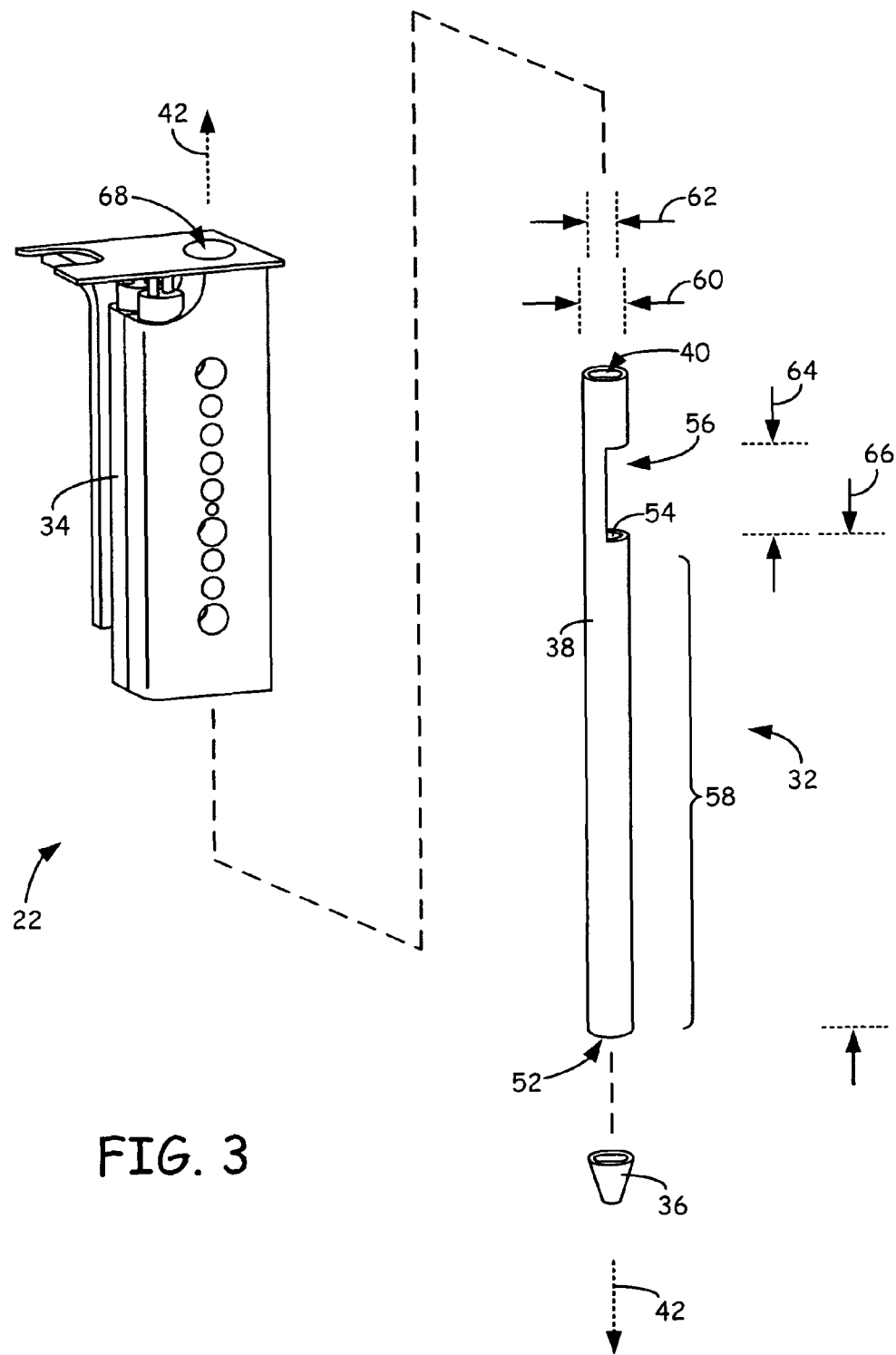
FIG. 3 is an exploded perspective view of the liquefier assembly.

FIG. 3 is an exploded perspective view of liquefier assembly 22, which illustrates the engagements between liquefier tube 32, thermal block 34, and extrusion tip 36. As shown, liquefier tube 32 further includes outlet opening 52, interior surface 54, port 56, and thermal gradient region 58. Outlet opening 52 is the opening at the second end of sidewall 38 along axis 42 that allows the molten material of filament 24 (shown in FIG. 1) to exit liquefier tube 32 through extrusion tip 36.

Interior surface 54 of sidewall 38 is the surface of sidewall 38 that laterally supports filament 24 while filament 24 extends through liquefier tube 32. Interior surface 54 may include a low-surface energy coating to further reduce friction with filament 24. Suitable coating materials for interior surface 54 include fluorinated polymers (e.g., polytetrafluoroethenes, fluorinated ethylene propylenes, and perfluoroalkoxy polymers), diamond-like carbon materials, and combinations thereof. As discussed below, due to the thermal gradient that is generated along the longitudinal length of sidewall 38 (i.e., along axis 42), the low-surface energy coating is desirably placed along interior surface 54 at a location outside of thermal gradient region 58 (e.g., adjacent to port 56) to reduce the risk of melting the low-surface energy coating. In one embodiment, interior surface 54 is smoothed and/or polished adjacent to port 56 to reduce sliding friction, and may also include axial scoring along axis 42 adjacent to port 56 to further reduce axial rotation of filament 24.

The outer diameter of sidewall 38 (referred to as outer diameter 60) desirably allows liquefier tube 32 to be inserted through support plate 44 (shown in FIG. 2), pulley 48 (shown in FIG. 2), and base block 46 (shown in FIG. 2), and to be retained by one or both of support plate 44 and base block 46. The inner diameter of sidewall 38 (referred to as inner diameter 62) is defined by interior surface 54 and may vary depending on the average diameter of filament 24. Inner diameter 62 desirably allows filament 24 to pass through liquefier tube 32 without excessive frictional resistance (e.g., about 5% to about 30% greater than the average diameter of filament 24). For example, for filament 24 having an average filament diameter of about 1.78 millimeters (about 0.070 inches), suitable average inner diameters 62 for sidewall 38 range from greater than about 1.78 millimeters (about 0.070 inches) to about 2.54 millimeters (about 0.100 inches), with particularly suitable average inner diameters ranges from about 2.03 millimeters (about 0.080 inches) to about 2.29 millimeters (about 0.090 inches). Examples of suitable average wall thicknesses for sidewall 38 (i.e., the difference between outer diameter 60 and inner diameter 62) range from about 0.127 millimeters (about 0.005 inches) to about 1.02 millimeters (about 0.040 inches), with particularly suitable average wall thicknesses ranging from about 0.254 millimeters (about 0.010 inches) to about 0.508 millimeters (about 0.020 inches).

Port 56 is an opening in sidewall 38 at a location between inlet opening 40 and outlet opening 52, and is desirably located adjacent to inlet opening 40 to provide a suitable length along sidewall 38 for thermal gradient region 58. As discussed below, port 56 allows pulley 48 (shown in FIG. 2) to engage with filament 24 after filament 24 is loaded into liquefier tube 32. This allows the internally-threaded surface (not shown) of pulley 48 to drive filament 24 through liquefier tube 32 toward thermal gradient region 58.

The dimensions of port 56 may vary depending on the dimensions of filament 24 and on the filament drive mechanism used (e.g., drive mechanism 30). For example, the length of port 56 along the longitudinal length of sidewall 38 (referred to as length 64) may vary depending on the dimensions of the internally-threaded surface of pulley 48. Examples of suitable lengths 64 for port 56 along axis 42 range from about 1.25 millimeters (about 0.05 inches) to about 25.0 millimeters (about 1.0 inch), with particularly suitable lengths 64 ranging from about 5.1 millimeters (about 0.2 inches) to about 12.7 millimeters (about 0.5 inches). Furthermore, the angle of the radial opening of port 56, as taken from a cross section of sidewall 38 that is normal to axis 42, may also vary depending on the engagement between the internally-threaded surface of the pulley 48 and filament 24. Examples of suitable angles for the radial opening of port 56 range from about 90 degrees to about 180 degrees, with particularly suitable angles ranging from about 130 degrees to about 160 degrees.

Thermal gradient region 58 is a region along the longitudinal length of sidewall 38 in which the thermal gradient generated by thermal block 34 (shown in FIG. 2) exists. Thermal gradient region 58 desirably extends along the longitudinal length of sidewall 38 below port 56, thereby preventing filament 24 from melting while engaged with pulley 48. Accordingly, thermal gradient region 58 desirably extends along the longitudinal length of sidewall 38 between port 54 and outlet opening 52. The desired length of sidewall 38 along axis 42 for thermal gradient region 58 to exist, between port 56 and outlet opening 52 (referred to as length 66), may vary depending on the heat transfer properties of thermal block 34, the wall thickness and material of sidewall 38, and the thickness, material, and drive rate of filament 24. Examples of suitable lengths 66 along axis 42 range from about 25 millimeters (about 1.0 inch) to about 250 millimeters (about 10 inches), with particularly suitable lengths 66 ranging from about 50 millimeters (about 2.0 inches) to about 130 millimeters (about 5.0 inches). In one embodiment, extrusion head 18 (shown in FIG. 1) also includes an airflow manifold (not shown) configured to direct cooling air toward inlet opening 40 and/or port 56 to further reduce the risk of the thermal gradient affecting filament 24 at port 56.

As further shown in FIG. 3, thermal block 34 includes channel 68, which is an opening that extends through thermal block 34 for receiving and retaining liquefier tube 32. During the assembly of liquefier assembly 22, liquefier tube 32 is secured within channel 64 of thermal block 34 such that port 56 extends above thermal block 34. As discussed above, this desirably restricts thermal gradient region 58 to a location below port 56. Liquefier tube 32 may be secured within channel 64 of thermal block 34 in a variety of manners. In one embodiment, thermal block 34 is separated (or otherwise opened) to allow direct access to channel 68. Liquefier tube 32 may then be inserted within channel 68, and thermal block may be reassembled (or otherwise closed) to provide good thermally-conductive contact between liquefier tube 32 and thermal block 34. Extrusion tip 36 is also secured to sidewall 38 at outlet opening 52. Liquefier assembly 22 may then be secured to drive mechanism 22 for use in extrusion head 18.

Figure 4:
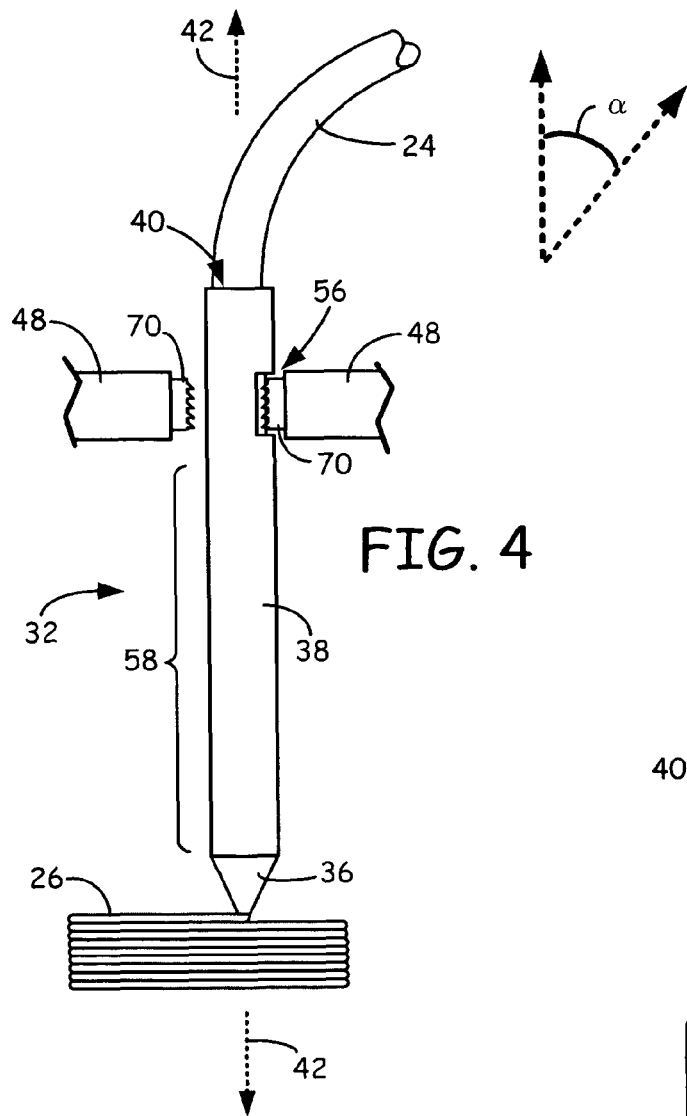
FIG. 4 is a side view of a liquefier tube in use with the filament drive mechanism for melting and extruding a filament strand.

FIG. 4 is a side view of liquefier tube 32 in use with pulley 48 of drive mechanism 30 (shown in FIG. 2) for melting and extruding material of filament 24 to build 3D object 26. Thermal block 34 of liquefier assembly 22, and support plate 44 and base block 46 of drive mechanism 30 are omitted in FIG. 4 for ease of discussion. As shown, pulley 48 includes inner surface 70, which is the internally-threaded surface of pulley 48 and is engaged with filament 24 at port 56. Examples of suitable internally-threaded surfaces for inner surface 70, and suitable engagements between filament 24 and inner surface 70 at port 56 are disclosed in U.S. Patent Application Publication No. 2009/0274540.

During the build operation to form 3D object 26, filament 24 is loaded into liquefier tube 32 at inlet opening 40. As discussed above, filament 24 desirably enters inlet opening 40 in a curved orientation due the curved feed pathway between filament supply source 20 (shown in FIG. 1) and liquefier tube 32. Examples of suitable average angles "α" for the curved orientation of filament 24 range from about 5 degrees to about 60 degrees, with particularly suitable average angles α ranging from about 10 degrees to about 30 degrees, where the average angle α is measured between the longitudinal length of liquefier tube 32 (i.e., along axis 42) and a line that is tangent to the curvature of filament 24, and where the tangential line is taken at a point along filament 24 that is adjacent to liquefier tube 32 and prior to entering inlet opening 40. As discussed below, the curved orientation of filament 24 reduces the axial rotation of filament 24 while passing through liquefier tube 32.

The rotation of pulley 48 allows inner surface 70 to drive successive portions of filament 24 downward along axis 42 through liquefier tube 32 toward thermal gradient region 58. While passing through liquefier tube 32 at thermal gradient region 58, the thermal gradient generated by thermal block 34 (shown in FIGS. 2 and 3) melts the material of filament 24 to an extrudable state. The unmelted, successive portion of filament 24, located upstream from thermal gradient region 58, is driven by pulley 48 and inner surface 70, and functions as a piston with a viscosity pump acting on the molten material between the unmelted portion and sidewall 38, thereby extruding the molten material of filament 24 through extrusion tip 36. The extruded material is then deposited as roads to build 3D object 26 in a layer-by-layer manner.

As discussed above, inlet opening 40 of liquefier tube 32 is located at an upstream position along axis 42 relative to pulley 48. As such, filament 24 enters liquefier tube 32 prior to engaging with inner surface 70, and is continuously supported by liquefier tube 32 during and after the engagement with inner surface 70. This effectively eliminates the potential issues that may occur with extrusion heads having separate filament drive mechanisms and liquefiers (e.g., filament alignment and filament buckling), thereby reducing the risk of interrupting a build operation with extrusion head 18 (shown in FIG. 1).

Figure 5:
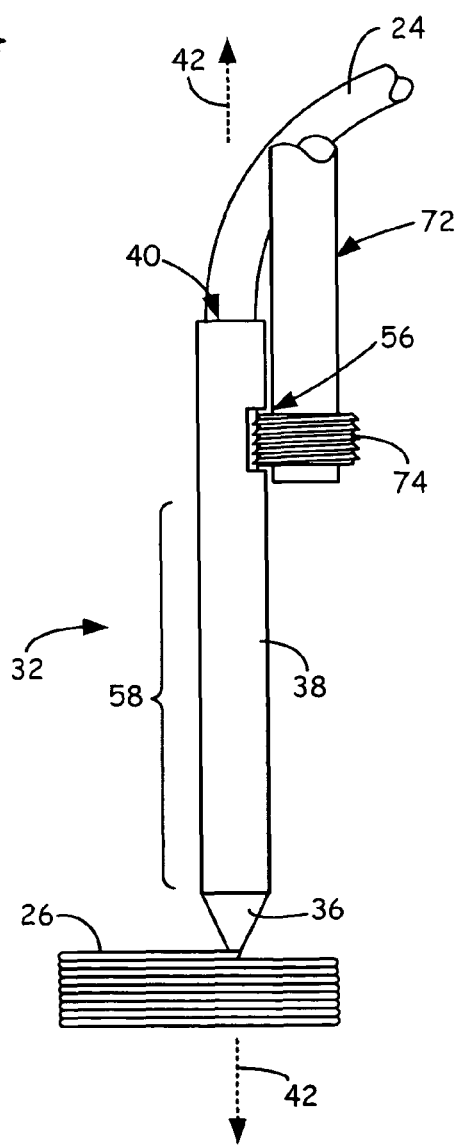
FIG. 5 is a side view of the liquefier tube in use with a first alternative filament drive mechanism having threaded rotatable shaft.

FIG. 5 is a side view of liquefier tube 32 in use with rotatable shaft 72 of an alternative filament drive mechanism for melting and extruding material of filament 24 to build 3D object 26. Thermal block 34 of liquefier assembly 22 is omitted in FIG. 5 for ease of discussion. In this embodiment, rotatable shaft 72 includes threaded surface 74, which is an externally-threaded surface engaged with filament 24 at port 56. The rotation of rotatable shaft 72 allows threaded surface 74 to drive successive portions of filament 24 downward along axis 42 through liquefier tube 32 toward thermal gradient region 58. The material of filament 24 is then melted in liquefier tube 32 at thermal gradient region 58, thereby allowing the molten material to be extruded from extrusion tip 36 to build 3D object 26 in a layer-by-layer manner.

In this embodiment, inlet opening 40 of liquefier tube 32 is located at an upstream position along axis 42 relative to threaded surface 74. As such, filament 24 enters liquefier tube 32 prior to engaging with threaded surface 74, and is continuously supported by liquefier tube 32 during and after the engagement with threaded surface 74. This effectively eliminates the potential issues that may occur with extrusion heads having separate drive mechanisms and liquefiers (e.g., filament alignment and filament buckling). Accordingly, liquefier assembly 22 is suitable for use with a variety of different filament drive mechanisms, where the filament drive mechanisms engage filament 24 after filament 24 is supported by liquefier tube 32 (e.g., at port 56).

Figure 6:
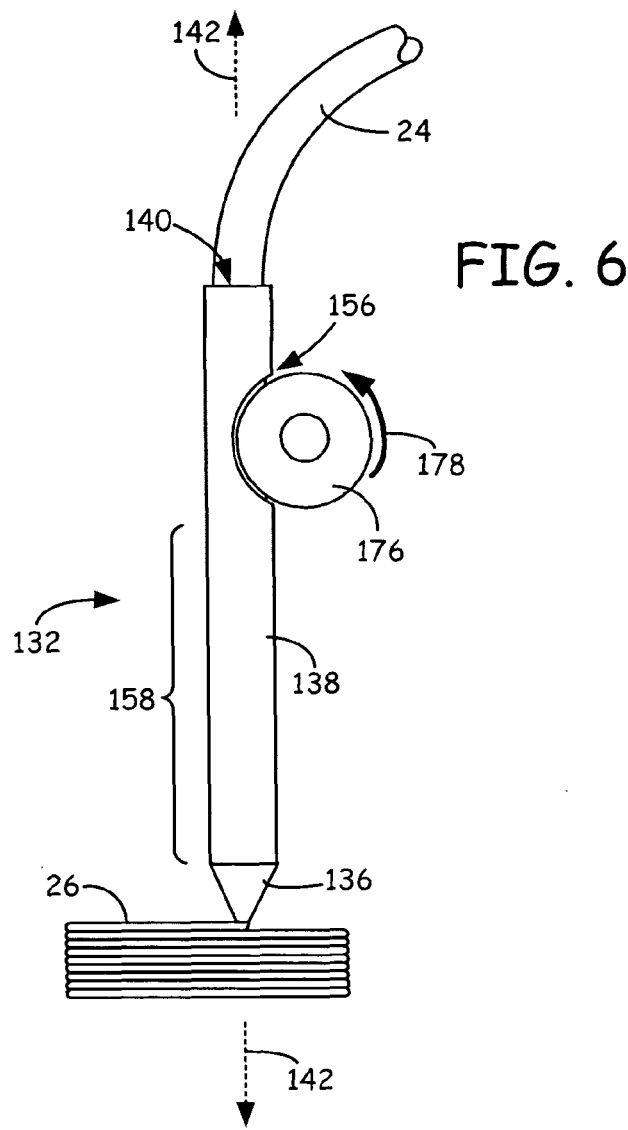
FIG. 6 is a side view of an alternative liquefier tube in use with a second alternative filament drive mechanism having rotatable roller.

FIG. 6 is a side view of liquefier tube 132 in use with roller 176 of an additional alternative filament drive mechanism for melting and extruding material of filament 24 to build 3D object 26. Liquefier tube 132 is a liquefier tube of an alternative liquefier assembly to liquefier assembly 22 (shown in FIGS. 1-5), where respective reference labels are increased by "100", and the thermal block corresponding to thermal block 34 (shown in FIGS. 2 and 3) is omitted in FIG. 6 for ease of discussion.

In the embodiment shown in FIG. 6, liquefier tube 132 includes port 156 in lieu of port 56 (shown in FIGS. 3-5), where port 156 has dimensions that accommodate the cylindrical geometry of roller 176. Roller 176 is rotatable roller configured to engage filament 24 at port 156, and to drive filament 24 downward along axis 142 through liquefier tube 132 toward thermal gradient region 158. In one embodiment, roller 176 includes one or more topographical features to assist in gripping and driving filament 24. For example, roller 176 may be a knurled roller as disclosed in LaBossiere et al., U.S. Publication No. 2007/0003656. The rotation of roller 176 (represented by arrow 178) drives successive portions of filament 24 downward along axis 142 toward thermal gradient region 158. As discussed above, the material of filament 24 is melted in liquefier tube 132 at thermal gradient region 158, thereby allowing the molten material to be extruded from extrusion tip 136 to build 3D object 26 in a layer-by-layer manner.

Inlet opening 140 of liquefier tube 132 is also located at an upstream position along axis 142 relative to roller 176. As such, filament 24 enters liquefier tube 132 prior to engaging with roller 176, and is continuously supported by liquefier tube 132 during and after the engagement with roller 176. This effectively eliminates the potential issues that may occur with extrusion heads having separate drive mechanisms and liquefiers (e.g., filament alignment and filament buckling). Accordingly, as discussed above, liquefier assembly 22 is suitable for use with a variety of different filament drive mechanisms, where the filament drive mechanisms engage filament 24 at the sidewall port (e.g., ports 56 and 74). Furthermore, the above-discussed embodiments also illustrate that the ports of the liquefier tubes (e.g., ports 56 and 156) may have dimensions that vary to accommodate different filament drive mechanisms.

Figure 7:
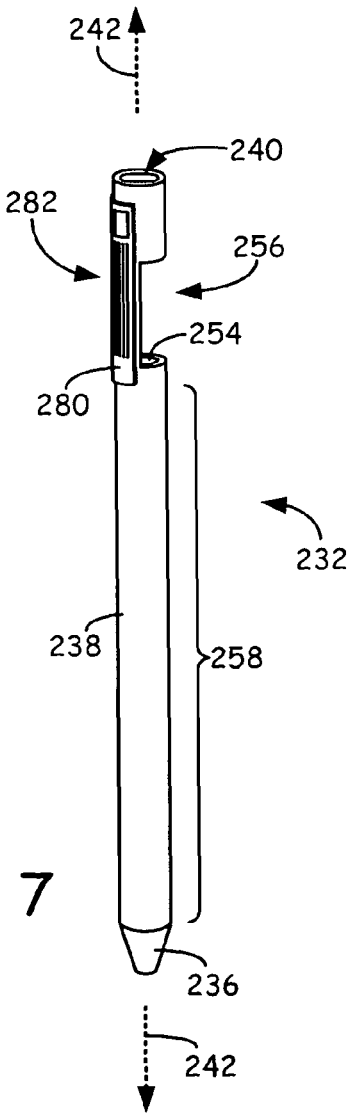
FIG. 7 is a top perspective view of a second alternative liquefier tube, which includes a strain gauge.

FIG. 7 is a top perspective view of filament tube 232, which is an additional alternative to liquefier tube 32 (shown in FIGS. 2-5), where corresponding reference labels are increased by "200". As shown, filament tube 232 includes strain gauge 280 secured to the port-compliment segment of sidewall 238 (referred to as segment 282), adjacent to port 256. Strain gauge 280 is desirably in signal communication with the computer-operated controller (not shown) of system 10 (shown in FIG. 1), and is desirably configured to compensate for variations in extrusion rates due to back pressure that may be generated within filament tube 232 during a build operation.

As the molten material of filament 24 is pressed into extrusion tip 236, a back pressure may be generated due to the reduction in the cross-sectional diameter at extrusion tip 236. The generated back pressure axially stretches sidewall 238 along axis 242, which can vary the amount of filament 24 that a filament drive mechanism (e.g., drive mechanism 30, shown in FIGS. 1 and 2) moves per rotation. As such, strain gauge 280 may be configured to monitor the axial stretching of sidewall 238 at segment 282, thereby monitoring the amount of back pressure generated within filament tube 232. Examples of suitable strain gauges include those configured to detect axial stretching and flexing in sidewall 238 at segment 282 having dimensional deviations of about 0.01% or greater. Based on this monitoring, strain gauge 280 may signal the computer-operated controller to modify the drive rate of the filament drive mechanism to compensate for variations in the extrusion rate that occur due to the generation of the back pressure. In alternative embodiments, filament tube 232 may also include additional sensors to monitor the performance of the build operation (e.g., thermal and optical sensors).

Figure 8:
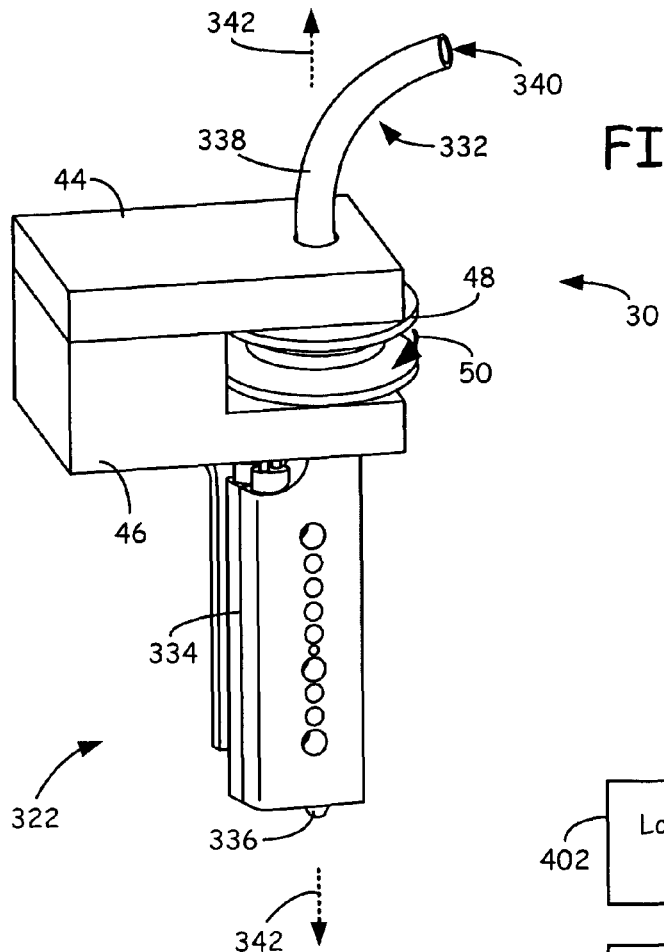
FIG. 8 is a top perspective view of an alternative liquefier assembly in use with a filament drive mechanism having a rotatable pulley, where the alternative liquefier assembly includes a curved liquefier tube.

FIG. 8 is a top perspective view of liquefier assembly 322 in use with drive mechanism 30, where liquefier assembly 322 is a further alternative to liquefier assembly 22 (shown in FIGS. 1-5) and the corresponding reference labels are increased by "300". As shown in FIG. 8, liquefier assembly 322 is similar to liquefier assembly 22, and operates in the same manner, with the exception that the portion of liquefier tube 332 located above support plate 44 has a curved geometry. Examples of suitable average angles for the curved geometry of liquefier tube 332 include those for average angles "a" discussed above for filament 24. As discussed above, the feed pathway of filament 24 (shown in FIG. 1) between filament supply source 20 (shown in FIG. 1) and liquefier tube 332 is desirably curved. This allows filament 24 to enter liquefier tube 332 with a curved orientation. The curved geometry of liquefier tube 332 assists in maintaining the curved orientation of filament 24 prior to engaging with pulley 48. This reduces the axial rotation of filament 24 as drive mechanism 30 feeds the successive portions of filament 24 through liquefier assembly 322.

Figure 9:
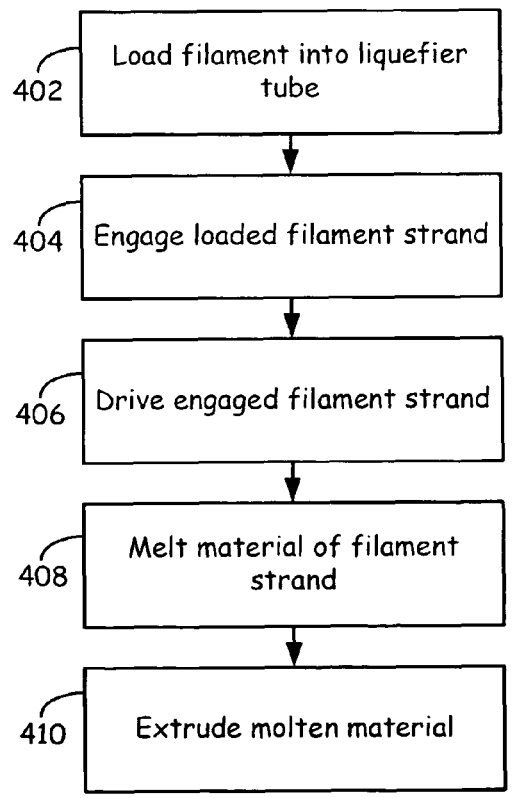
FIG. 9 is a flow diagram of a method for building a 3D object with the extrusion-based digital manufacturing system.

FIG. 9 is a flow diagram of method 400 for building a 3D object (e.g., 3D object 26, shown in FIG. 1) and/or a support structure (e.g., support structure 28, shown in FIG. 1) with system 10 (shown in FIG. 1). The following discussion of method 400 is made with reference to liquefier assembly 22 (shown in FIGS. 1-5) and drive mechanism 30 (shown in FIG. 2) with the understanding that method 400 is also suitable for use with the above-discussed alternative liquefier assemblies (e.g., liquefier assembly 332) and with a variety of filament drive mechanisms. As shown, method 400 includes steps 402-410, and initially involves loading filament 24 (shown in FIG. 1) into liquefier tube 32 at inlet opening 40 such that filament 24 extends downward along axis 42 at least through port 56 (step 402).

After filament 24 is loaded into liquefier tube 32, inner surface 70 of pulley 48 is engaged with filament 24 (step 404), and pulley 48 is rotated to drive successive portions of filament 24 through liquefier tube 32 along axis 42 toward thermal gradient zone 58 (step 406). While passing through liquefier tube 32 at thermal gradient region 58, the thermal gradient generated by thermal block 34 (shown in FIGS. 2 and 3) melts the material of filament 24 to an extrudable state (step 408). The unmelted, successive portion of filament 24, located upstream from thermal gradient region 58, is driven by pulley 48 and inner surface 70, and functions as a piston with a viscosity pump acting on the molten material between the unmelted portion and sidewall 38, thereby extruding the molten material of filament 24 through extrusion tip 36 (step 410). The extruded material is then deposited as roads to build 3D object 26 in a layer-by-layer manner.

Method 400 is suitable for building 3D object 26 while effectively eliminating the potential issues that may occur with extrusion heads having separate filament drive mechanisms and liquefiers (e.g., filament alignment and filament buckling). As discussed above, this is due to filament 24 being loaded into liquefier tube 32 prior to being driven with drive mechanism 30. With this arrangement, liquefier tube 32 provides continuous support to filament 24 while drive mechanism 30 feeds successive portions of filament 24 to thermal gradient region 58. As a result, the risk of interrupting a build operation with system 10 due to issues such as filament misalignment or filament buckling is reduced.

Although the present invention has been described with reference to preferred embodiments, workers skilled in the art will recognize that changes may be made in form and detail without departing from the spirit and scope of the invention.

The invention claimed is:

1. A liquefier assembly for use in an extrusion-based digital manufacturing system, the liquefier comprising:
   a liquefier tube comprising:
   a sidewall having a longitudinal length, and an inlet opening and an outlet opening on opposing ends of the sidewall, wherein the inlet opening is configured to receive a filament strand, wherein the sidewall further comprises an interior surface extending between the inlet opening and the outlet opening; and
   a port disposed through the sidewall at a location between the inlet opening and the outlet opening, the port being configured to provide access for a filament drive mechanism to engage with the received filament strand, wherein the interior surface of the sidewall includes a portion adjacent to and opposite of the port that is configured to laterally support the engaged filament strand; and a heat transfer component configured to generate a thermal gradient along at least a portion of the longitudinal length of the sidewall between the port and the outlet opening.

2. The liquefier assembly of claim 1, wherein the port has a length in a direction along the longitudinal length of the sidewall ranging from about 1.25 millimeters to about 25.0 millimeters.

3. The liquefier assembly of claim 1, wherein the port has a radial opening angle ranging from about 90 degrees to about 180 degrees, and wherein the radial opening angle is taken from a cross section of the sidewall that is normal to the longitudinal length of the sidewall.

4. The liquefier assembly of claim 3, wherein the radial opening angle ranges from about 130 degrees to about 160 degrees.

5. The liquefier assembly of claim 1, wherein the port and the outlet opening are separated along the longitudinal length by a distance ranging from about 25 millimeters to about 250 millimeters.

6. The liquefier assembly of claim 1, further comprising a strain gauge secured to the sidewall at a location adjacent to the port.

7. The liquefier assembly of claim 1, wherein the portion of the inner surface adjacent to and opposite of the port comprises a coating selected from the group consisting of fluorinated polymers, diamond-like carbon materials, and combinations thereof.

8. The liquefier assembly of claim 1, wherein the received filament strand has a curved orientation prior to entering the inlet opening of the liquefier tube, the curved orientation having an average angle ranging from about 5 degrees to about 60 degrees as measured between an axis parallel to the longitudinal length of the sidewall and a tangential line to the curved orientation of the received filament strand.

9. The liquefier assembly of claim 1, wherein the liquefier tube comprises a curved portion adjacent to the inlet opening.

10. An extrusion head for use in an extrusion-based digital manufacturing system, the extrusion head comprising:
a filament drive mechanism configured to drive a filament strand;
a liquefier tube comprising:
a sidewall having an interior surface;
an inlet opening located at a first end of the sidewall and configured to receive the filament strand;
an outlet opening located at the second end of the sidewall; and
a port disposed through the sidewall at a location between the inlet opening and the outlet opening, the port being configured to receive the filament drive mechanism for engaging the filament strand after the filament strand is received through the inlet opening, and wherein the interior surface of the sidewall includes a portion adjacent to and opposite of the port that is configured to laterally support the engaged filament;
a heat transfer component extending around at least a portion of the sidewall between the port and the outlet opening, the heat transfer component being configured to create a thermal gradient along at least a portion of the sidewall; and an extrusion tip secured to the sidewall at the outlet opening.

11. The extrusion head of claim 10, wherein the port has a radial opening angle ranging from about 90 degrees to about 180 degrees, and wherein the radial opening angle is taken from a cross section of the sidewall that is normal to the longitudinal length of the sidewall.

12. The extrusion head of claim 10, wherein the port and the outlet opening are separated along the longitudinal length by a distance ranging from about 25 millimeters to about 250 millimeters.

13. The extrusion head of claim 12, wherein the distance between the port and the outlet opening ranges from about 50 millimeters to about 130 millimeters.

14. The extrusion head of claim 10, wherein the filament drive mechanism comprises a component selected from the group consisting of a rotatable component having an internally-threaded surface, a rotatable shaft having an externally-threaded surface, a rotatable roller, and combinations thereof.

15. A method of building a three-dimensional object with an extrusion-based digital manufacturing system having an extrusion head, the method comprising:
loading a filament stand into an inlet opening of a liquefier tube of the extrusion head, wherein the liquefier tube comprises an interior surface and a sidewall port disposed between the inlet opening and an outlet opening, wherein the outlet opening is separated from the inlet opening along a longitudinal length of the liquefier tube;
engaging a filament drive mechanism with the filament strand at the sidewall port after the filament strand is loaded into the inlet opening, wherein a portion of the interior surface adjacent to and opposite of the sidewall port laterally supports the engaged filament strand;
driving successive portions of the engaged filament strand toward a thermal gradient region of the liquefier tube with the filament drive mechanism;
melting the driven successive portions of the engaged filament strand at the thermal gradient region; and
extruding the molten portions of the filament strand through an extrusion tip.

16. The method of claim 15, further comprising generating the thermal gradient region with a heat transfer component that extends around at least a portion of the liquefier tube between the sidewall port and the outlet opening.

17. The method of claim 15, further comprising curving the filament strand to a curved orientation before loading the filament strand into the inlet opening of the liquefier tube, wherein the curved orientation has an average angle ranging from about 5 degrees to about 60 degrees as measured between an axis parallel to a longitudinal length of the liquefier tube and a tangential line to the curved orientation of the filament strand.

18. The method of claim 15, wherein the sidewall port and the outlet opening are separated along the longitudinal length by a distance ranging from about 25 millimeters to about 250 millimeters.

19. The method of claim 18, wherein the distance between the sidewall port and the outlet opening ranges from about 50 millimeters to about 130 millimeters.

20. The method of claim 15, further comprising:
monitoring an axial stretching of the liquefier tube with a strain gauge; and
adjusting a drive rate of the filament drive mechanism based at least in part on the monitored axial stretching.

* * * * *